(No Model.)

J. S. DICKEY.
CHURNING DEVICE.

No. 343,015. Patented June 1, 1886.

WITNESSES:
Fred G. Dieterich
P. B. Turpin

INVENTOR:
John S. Dickey
BY Munn & Co
ATTORNEYS.

UNITED STATES PATENT OFFICE.

JOHN S. DICKEY, OF PAYNE, TEXAS.

CHURNING DEVICE.

SPECIFICATION forming part of Letters Patent No. 343,015, dated June 1, 1886.

Application filed March 9, 1886. Serial No. 194,511. (No model.)

*To all whom it may concern:*

Be it known that I, JOHN S. DICKEY, a citizen of the United States, residing at Payne, in the county of Brown and State of Texas, have invented certain new and useful Improvements in Churning Devices, of which the following is a description, reference being had to the accompanying drawings, in which—

Figure 1:
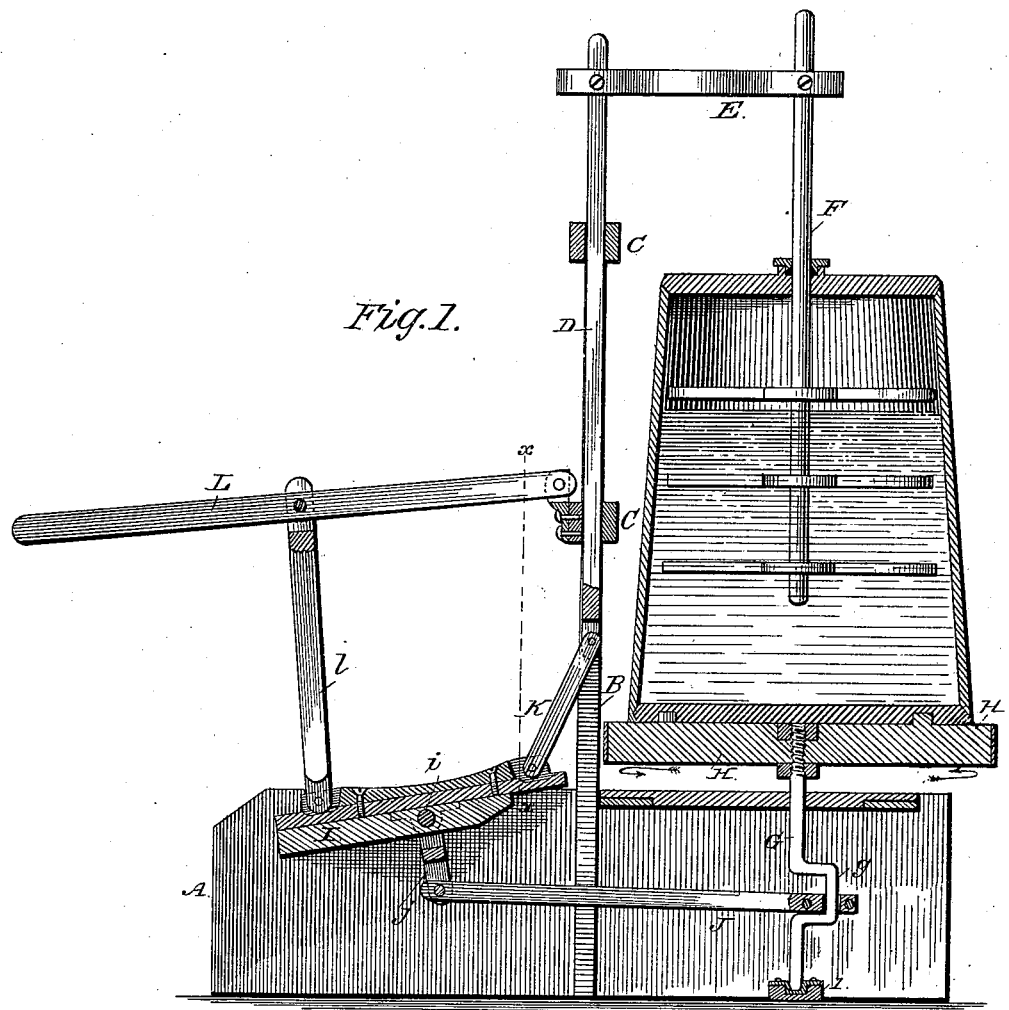
Figure 2:
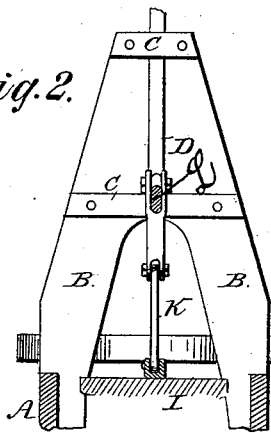

Figure 1 is a vertical section of a machine constructed according to my invention, and Fig. 2 is a detached sectional view on about line $x$ $x$, Fig. 1.

The invention is intended especially for use in connection with churns; and it consists in certain novel constructions and combinations of parts, as will be described and claimed.

On a suitable base or frame, A, I mount the uprights B, which constitute the standard, and are connected by battens C, and form, together with said battens, a guide or way for the vertically-sliding rod or bar D. In the use of the device the sliding rod is connected usually by a bar, E, as shown, with a vertically-movable dasher-rod, F. In the base-frame is journaled a vertical shaft, G, provided with a crank, $g$, and having its lower end stepped in a bearing, 1. A platform or carrier, H, is mounted rigidly on the upper end of shaft G. A treadle, I, is pivotally supported at $i$ between its ends, and is connected by a pitman, J, with the crank $g$ of shaft G. The connection of the pitman with the treadle is preferably effected by means of an arm, $j$, depending from said treadle and approximately radial to the pivot thereof, as shown. The treadle is also connected by a pitman, K, with the sliding rod D. This treadle may be operated by the feet or by means of the lever L, pivotally supported and connected by a link, $l$, with the treadle off the pivot of the latter, and by providing the lever the treadle may be alternately worked by the lever and the feet, or the feet and hands may both be used at the same time to drive the motor.

As the treadle is worked, it will be seen the vertical rod is reciprocated, and the crank-shaft, with the platform and churn-body, is revolved continuously. The churn-body may be fixed from turning on the platform in any suitable manner. In the construction shown its bottom is provided with sockets fitted to receive pins or studs on the platform; but this may be varied as desired. By thus giving a continuous rotary motion to the churn-body and a vertical reciprocating motion to the dasher all the particles of milk and cream are subjected to the churning action, and the churning is therefore quickly completed.

By the devices shown I provide a simple and inexpensive construction, which can be easily worked and possesses no part likely to get out of order or wear quickly, as will be obvious from the drawings and foregoing description.

It will be noticed that the churn-body will serve as a drive or fly wheel, and that the greater the quantity of the milk therein the greater its force as a fly-wheel, by reason of its increase in weight.

I claim—

1. The combination, with the base having uprights forming guides for the vertically-movable rod, of the rod movable in said guides and adapted to be connected with a rod or dasher, the treadle, a link connecting the treadle with said rod, the shaft having a platform adapted to support the churn-body and provided with a crank, and a pitman connecting said crank with the treadle, substantially as set forth.

2. The combination of the base provided with uprights forming guides, the rod movable vertically in said guide and adapted for connection with a dasher-rod, the treadle, a link connecting said treadle and rod, a pivoted hand-lever, a link connecting the lever and treadle, the shaft having a platform whereby to support a churn or other body, and a crank and the pitman connecting said crank with the treadle, substantially as set forth.

The above specification of my invention signed by me in the presence of two subscribing witnesses.

JOHN S. DICKEY.

Witnesses:
P. B. TURPIN,
SOLON C. KEMON.